United States Patent [19]

Yagi et al.

[11] 3,919,984
[45] Nov. 18, 1975

[54] INTERNAL COMBUSTION ENGINE WITH AUXILIARY CHAMBER HAVING VARIABLE SIZE OPENINGS

[75] Inventors: Shizuo Yagi, Asaka; Kazuo Inoue, Tamashi, both of Japan

[73] Assignee: Honda Giken Kogyo Kabushiki Kaisha, Tokyo, Japan

[22] Filed: Jan. 23, 1974

[21] Appl. No.: 435,864

[52] U.S. Cl....... 123/32 SP; 123/75 B; 123/33 VC; 123/32 SA; 123/169 V; 123/188 AF
[51] Int. Cl.² ................. F02B 16/19; F02B 16/10
[58] Field of Search .......... 123/75 B, 32 SP, 32 ST, 123/33 VC, 191 S, 191 SP, 32 SA, 188 AF, 169 V

[56] References Cited
UNITED STATES PATENTS

| | | | |
|---|---|---|---|
| 1,461,088 | 7/1923 | Gosnell | 123/169 V |
| 1,550,104 | 8/1925 | Schwer | 123/33 VC |
| 1,821,173 | 9/1931 | Berner | 123/32 SA |
| 2,198,979 | 4/1940 | Schwaiger | 123/33 VC |
| 3,830,205 | 8/1974 | Pate | 123/32 SP |

FOREIGN PATENTS OR APPLICATIONS

| | | | |
|---|---|---|---|
| 227,881 | 1/1925 | United Kingdom | 123/191 S |

*Primary Examiner*—Charles J. Myhre
*Assistant Examiner*—Ronald B. Cox
*Attorney, Agent, or Firm*—Lyon & Lyon

[57] ABSTRACT

A three-valve spark-ignition internal combustion piston engine has an auxiliary combustion chamber connected to each main combustion chamber through a torch nozzle. The intake valve for the auxiliary chamber is provided with a skirt for varying the effective size of the torch nozzle under controlled turning movement of the intake valve stem. The effective size of a restricted opening which connects the auxiliary chamber to an adjacent chamber containing the spark plug electrodes is also changed by means of a skirt on the auxiliary intake valve.

9 Claims, 17 Drawing Figures

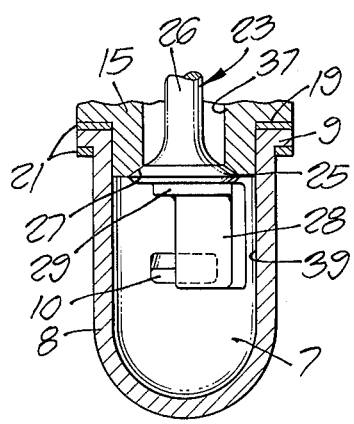
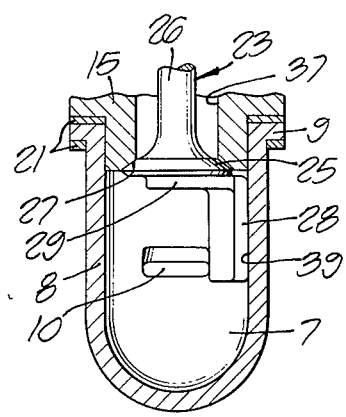
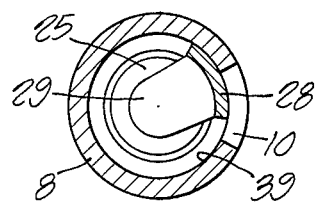
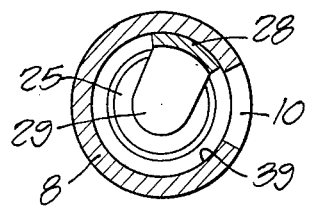
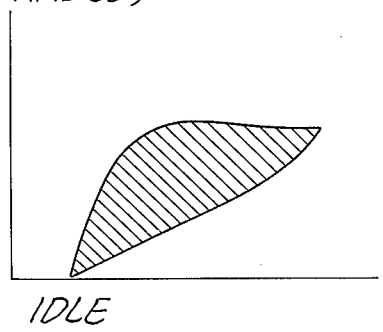
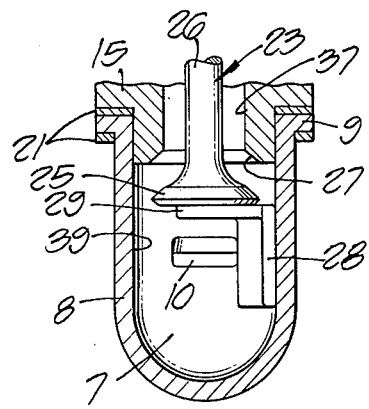
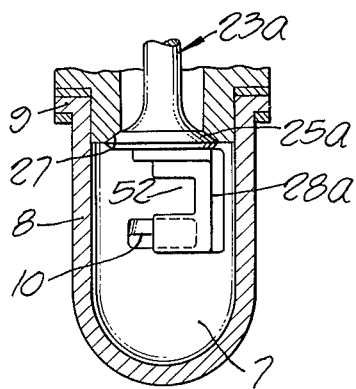
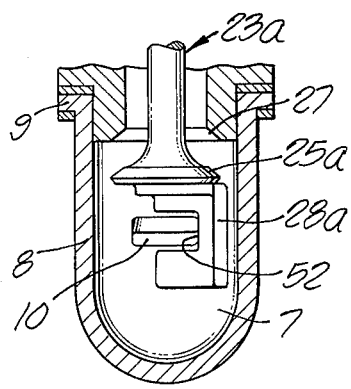
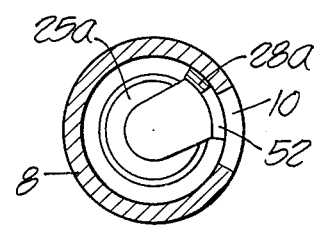

INTERNAL COMBUSTION ENGINE WITH AUXILIARY CHAMBER HAVING VARIABLE SIZE OPENINGS

This invention relates to internal combustion piston engines of the type having one or more main combustion chambers each connected by means of a torch nozzle to an auxiliary combustion chamber, respectively. A rich mixture supplied to the auxiliary combustion chamber is spark-ignited to provide a flame which is projected through the torch nozzle to burn a relatively lean mixture in the main combustion chamber. Each main chamber is provided with an intake valve and an exhaust valve and each auxiliary chamber is provided with an intake valve. Accordingly, engines of this type are known as three-valve engines. The valves are opened and closed in timed sequence by conventional cam mechanisms.

In conventional three-valve engines, good performance and more stabilized combustion are both achieved when the effective size of the torch nozzle is relatively large during idling conditions. As a result there are less carbon monoxide (CO) and unburned hydrocarbons (HC) emissions during idling conditions. On the other hand, if the effective size of the torch nozzle is relatively small at heavier loads than that during idling conditions, the smaller torch nozzle provides better power output and fuel economy at heavier load conditions.

This invention contemplates varying the effective size of the torch nozzle during operation of the engine to achieve good performance, good fuel economy and minimum CO and HC emissions during the entire range of engine operations from idling to full load. This invention relates to improvements over the disclosure of the copending application of Yagi, et al filed Jan. 21, 1974, Ser. No. 434,916 entitled "Variable Size Torch Nozzle For Internal Combustion Engine".

It has been found that when a small quantity of residual gas is stored in a chamber adjacent the auxiliary combustion chamber at the end of each exhaust stroke, it is possible to reduce the emissions of nitrogen oxides ($NO_x$). Such an engine is disclosed in our copending application Ser. No. 405,483 filed Oct. 11, 1973, entitled "Method and Apparatus Using Proportional Residual Gas Storage to Reduce $NO_x$ Emissions from Internal Combustion Engines". A restricted opening connects the residual gas chamber to the auxiliary combustion chamber and the spark plug electrodes are located close to this opening and remote from the end wall of the residual gas chamber. It has been found that it is desirable to increase the quantity of residual gas in the residual gas chamber when the engine is operating under medium loads, between light loads and heavy loads, in order to reduce $NO_x$ emissions. In accordance with this invention, a second skirt may be mounted on the auxiliary intake valve and positioned to vary the effective size of the restricted opening upon turning movement of the auxiliary valve stem.

Other and more detailed objects and advantages will appear hereinafter.

In the drawings:

FIG. 3 is a sectional elevation taken on the lines 3—3 as shown in FIG. 1.

FIG. 4 is a sectional detail taken on the lines 4—4 as shown in FIG. 1.

FIG. 5 is a view similar to FIG. 3 showing the valve part in a different position.

FIG. 6 is a view similar to FIG. 4 but showing the valve part in the position shown in FIG. 5.

FIG. 7 is a view similar to FIG. 5 showing the valve part in open position.

FIG. 8 is a graph showing how the overlap area between the valve skirt and the torch nozzle may change for varying loads on the engine.

FIG. 9 is a view similar to FIG. 3 showing a modification.

FIG. 10 shows the same modification when the poppet valve is in open position.

FIG. 11 shows the same modification and is otherwise similar to FIG. 4.

FIG. 17 is a perspective view of certain of the parts.

Figure 2:
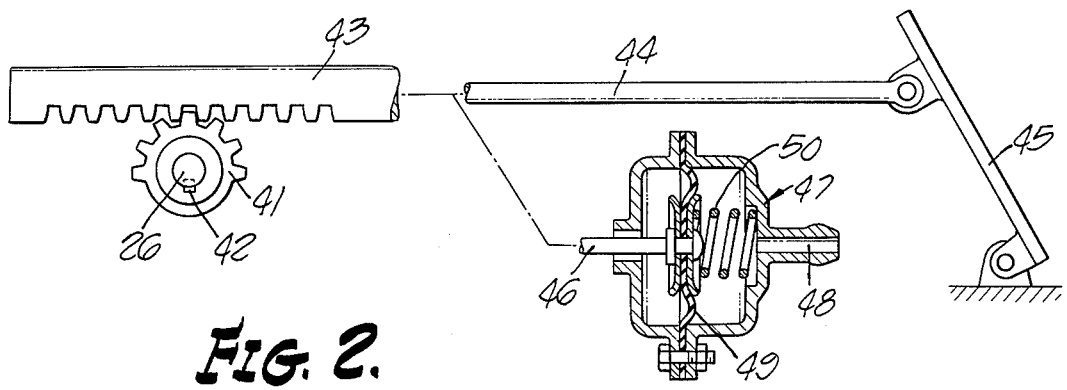
FIG. 2 is a detail partly in section taken on the lines 2—2 as shown in FIG. 1.
Figure 1:
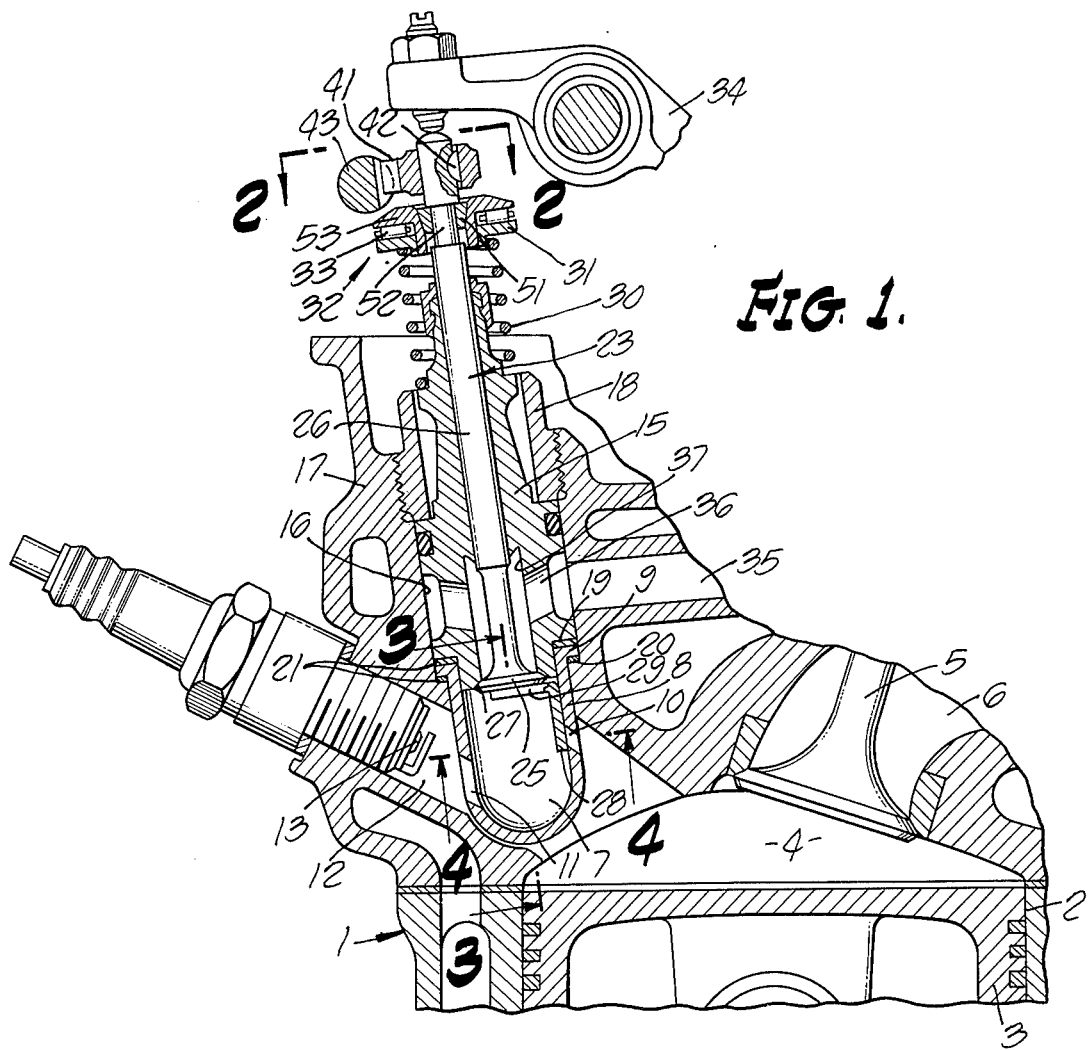
FIG. 1 is a sectional view, partly broken away, showing a preferred embodiment of this invention.
Figure 12:
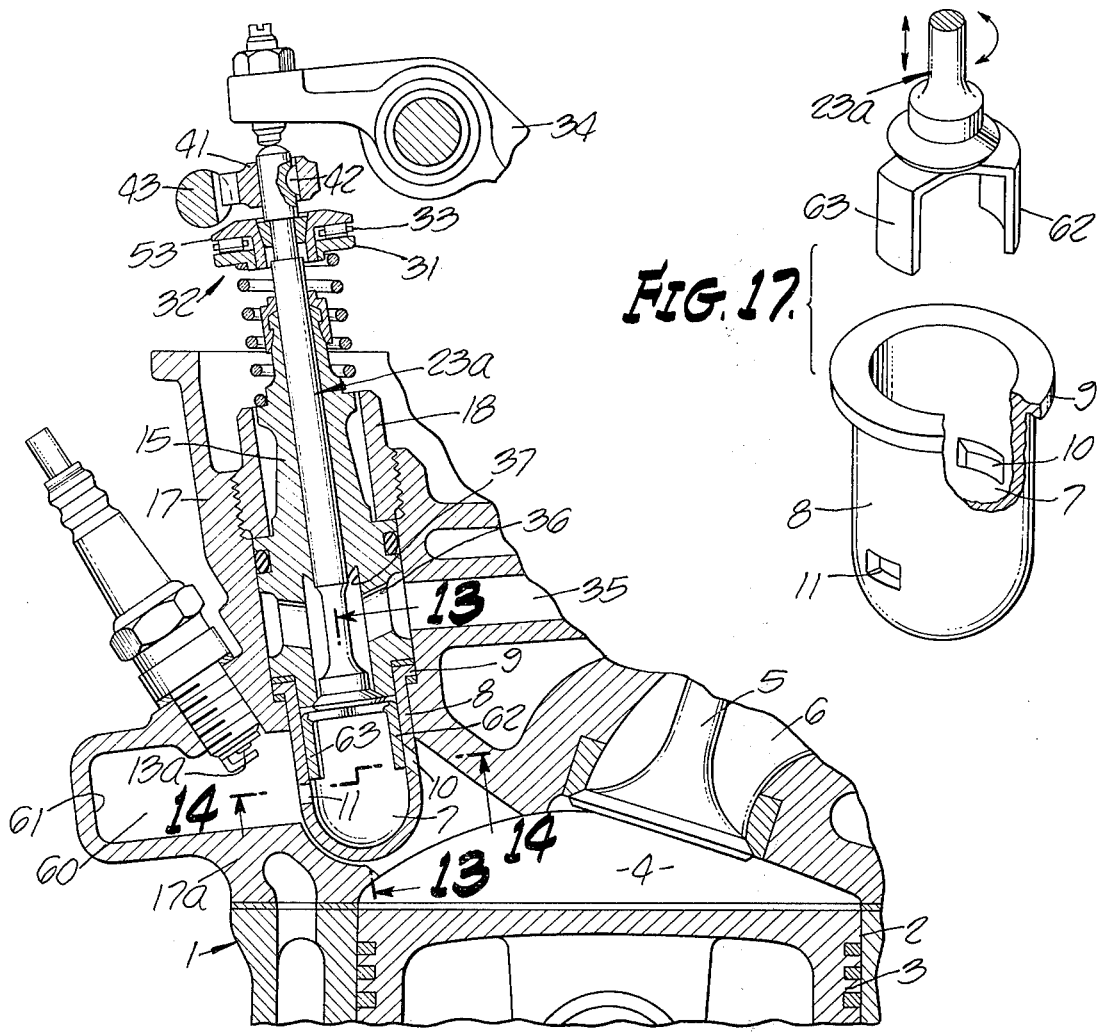
FIG. 12 is a sectional elevation partly broken away showing a second modification.
Figure 13:
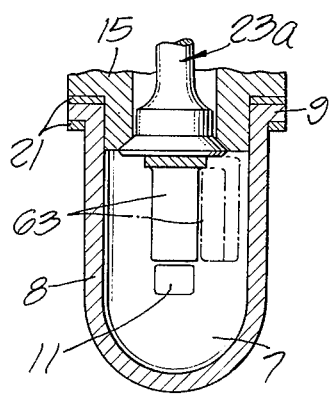
FIG. 13 is a sectional detail taken substantially on the lines 13—13 as shown in FIG. 12.
Figure 15:
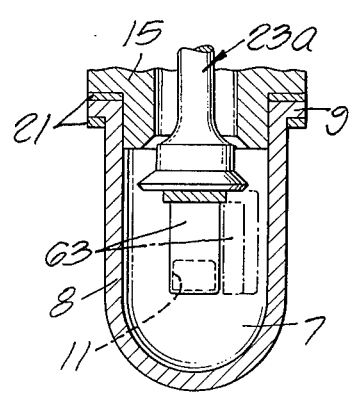
FIG. 15 is a view similar to FIG. 13, the poppet being in open position.
Figure 14:
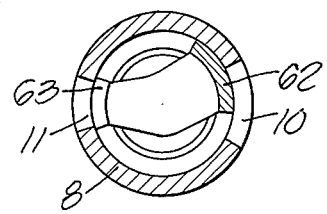
FIG. 14 is a transverse sectional detail taken substantially on the lines 14—14 as viewed in FIG. 12.
Figure 16:
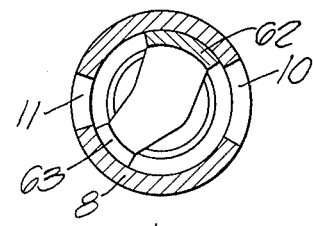
FIG. 16 shows the same modification, the view being similar to FIG. 14.

Referring to the drawings, the engine generally designated 1 is provided with one or more cylinders 2 each having a reciprocating piston 3 mounted therein. Each piston forms one wall of a main combustion chamber 4. The main intake valve 5 controls admission of lean mixture from the intake passage 6 to the main combustion chamber 4.

An auxiliary combustion chamber 7 is defined within a thin wall cup 8 formed of heat resistant material such as, for example, stainless steel. This cup 8 has a radially projecting flange 9 at its open end and has a round bottom portion which is closed. An aperture 10 in the cylindrical wall of the cup 8 connects the auxiliary chamber 7 with the main chamber 4. A restricted opening 11 in the cup 8 connects the auxilary chamber 7 to the space 12 outside the cup 8, which space or plug chamber contains the spark plug electrodes 13.

The valve guide member 15 is axially insertable into the bore 16 in the engine head 17 and is held in place by a clamping nut 18. A shoulder 19 on the valve guide 15 clamps the flange 9 with respect to the shoulder 20. Insulating gaskets 21 are provided on opposite sides of the flange 9 of the cup 8.

In accordance with this invention, the auxiliary intake valve 23 has an enlarged head 25 at one end of the valve stem 26 and this head 25 cooperates with the annular stationary seat 27 to form a seal when the valve is in closed position. A curved skirt 28 is fixed to the valve head 25 by means of the skirt support 29, and the function of this skirt 28 is described below. The coil compression spring acts to move the valve stem 26 axially in the guide member 15 to close the head 25 against the stationary seat 27. One end of the spring 30 acts on the lower element 31 of a thrust bearing assembly 32 containing roller elements 33. Conventional cam-operated mechanism 34 acts on the upper end of the valve stem 26 to oppose the action of the spring 30 to move the valve head 25 axially away from the stationary seat 27 and thus open the auxiliary intake valve. When the valve is open, as shown in FIG. 7, rich mixture is delivered through passage 35, ports 36 and bore 37 to enter the interior of the auxiliary combustion chamber 7.

The skirt 28 fixed to the valve head 25 is curved in cross section as shown in FIGS. 4 and 6, and has sliding clearance within the cylindrical wall surface 39 of the cup 8. The valve stem 26 may be turned when desired to turn the skirt 28 between the partially closed position shown in FIGS. 3 and 4 and the fully open position shown in FIGS. 5 and 6. When the skirt 28 is in the position shown in FIGS. 3 and 4, the effective size of the torch nozzle 10 is restricted. On the other hand, when the skirt 28 is in the open position shown in FIGS. 5 and 6, the effective size of the torch nozzle 10 is unrestricted.

Means are provided for rotating the valve stem 26, and as shown in the drawings, this means includes a spur gear segment 41 fixed to the valve stem 26 by means of a key 42. This gear segment 41 meshes with the teeth on a rack 43. Suitable guide means, not shown, are provided for the rack 43. As shown in FIG. 2, the rack may be connected for operation by the rod 44 attached to the accelerator pedal 45, or it may be connected for operation by the stem 46 connected to a vacuum-operated device 47. Manifold vacuum pressure may be applied to the terminal 48 to cause the flexible diaphragm 49 to move the stem 46 in opposition to the force of the coil compression spring 50. Axial reciprocating movement of the valve stem 26 is accomplished by the action of the rotating cam and the spring 30, and during such movement the teeth of the gear segment 41 reciprocate with respect to the teeth of the rack 43. Rotary movement of the stem 26 to change the position of the skirt 28 with respect to the torch nozzle 10 is accomplished by moving the rack 43. The split wedge collar 51 engages the groove 52 in the upper portion of the valve stem 26, and this wedge collar 51 is seated in the body 53 of the thrust bearing assembly 32. The rollers 33 permit turning movement of the body 53 with respect to the lower element 31.

FIG. 8 shows that very little overlap of the skirt 28 with respect to the torch nozzle 10 occurs when the engine is idling. As the load on the engine increases, however, the valve stem 26 is turned to cause a greater extent of overlap and thus to reduce the effective size of the torch nozzle 10.

In operation, rich mixture is delivered from a first carburetor through passage 35 to the auxiliary chamber 7, controlled by the auxiliary intake valve 23. At the same time, lean mixture from the second carburetor is delivered to the main combustion chamber 4, controlled by the main intake valve 5. An exhaust valve, not shown, is also provided for the main combustion chamber 4. All three valves are cam-operated by conventional means. The mixture in the auxiliary chamber 7 is ignited by the spark plug electrodes 13 and this results in a jet of flame projected through the torch nozzle 10 into the main combustion chamber 4 to ignite the relatively lean mixture therein. The effective size of the torch nozzle 10 is varied by turning the valve stem 26 to vary the extent of overlap of the skirt 28 with respect to the torch nozzle 10.

In the modified form of the invention as shown in FIGS. 9, 10 and 11, the thin wall cup 8 and the torch nozzle 10 are the same as that previously described, but the skirt 28a is provided with a slot 52. When the valve 23a is moved to the open position shown in FIG. 10, the slot 52 is aligned with the torch nozzle 10 to avoid restricting its effective size. Turning of the valve 23a, however, serves to reduce the effective opening through the torch nozzle 10. When the valve head 25a is closed against the seat 27, the angular position of the skirt 28a determines the degree of restricting the effective size of the torch nozzle 10. When the valve head 25a is spaced from the seat 27 in open position, as shown in FIG. 10, no restriction occurs regardless of the angular position of the skirt 28a.

In a modified form of the invention shown in FIGS. 12–16, the parts are the same as those previously described except that a residual gas chamber 60 is provided on the engine head 17a, the spark plug electrodes 13a being positioned closer to the restricted opening 11 than to the end wall 61, as disclosed in our copending application identified above. Also, in this modified form of the invention the auxiliary intake valve 23a has two skirts 62 and 63 instead of a single skirt. Both skirts extend into the auxiliary chamber 7 and are curved to conform to the shape of the inner wall of the cup 8. The first skirt 62 acts to control the effective size of the torch nozzle 10, and the second skirt 63 acts to control the effective size of the restricted opening 11. This opening 11 established communication between the residual gas chamber 60 and the auxiliary combustion chamber 7. The rotary cam mechanism 34 acts to move the auxiliary intake valve 23a from the closed position shown in FIG. 13 to the open position shown in FIG. 15. Rotary movement of the auxiliary intake valve 23a moves the skirts 62 and 63 from the restricted position shown in FIG. 14 to the fully open position shown in FIG. 16. The open position of the skirt 63 is shown in phantom lines in FIGS. 13 and 15.

From the foregoing description its will be understood that changing of the effective size of the torch nozzle 10 when the engine load changes results in maintaining low emissions of CO and HC throughout the operating range of the engine. Also, changing the effective size of the restricted opening which connects the spark plug chamber to the auxiliary chamber enables the engine to minimize production of $NO_x$ emissions for various engine load conditions.

Having fully described our invention, it is to be understood that we are not to be limited to the details herein set forth but that our invention is of the full scope of the appended claims.

We claim:

1. In a spark-ignition internal combustion piston engine having a main combustion chamber and an auxiliary combustion chamber connected by a torch nozzle, the combination of: means including a first intake passage for delivering a lean mixture to the main chamber, and means including a second intake passage for delivering a rich mixture to the auxiliary chamber, a spark plug having electrodes positioned in a space communicating with the auxiliary chamber through a restricted opening, an auxiliary intake valve assembly positioned to control flow through the second intake passage into the auxiliary chamber, said intake valve asembly having a movable valve element, and means on the movable valve element projecting into the auxiliary chamber to vary the effective size of said restricted opening.

2. The combination set forth in claim 1 in which the latter said means also acts to very the effective size of the torch nozzle.

3. The combination set forth in claim 1 wherein the latter said means comprises a skirt shaped so that axial movement thereof does not vary the effective size of the torch nozzle.

4. In an internal combustion piston engine, the combination of: a main combustion chamber and an auxiliary combustion chamber connected by a torch nozzle opening, means including a first intake passage for delivering a lean mixture to the main chamber and means including a second intake passage for delivering a rich mixture to the auxiliary chamber, a spark plug having electrodes positioned in a plug chamber adjacent the auxiliary combustion chamber, means forming a restricted opening connecting the plug chamber to the auxiliary chamber, an auxiliary intake valve assembly positioned to control flow through the second intake passage into the auxiliary chamber, said intake valve assembly having a stationary seat and having a stem provided with an enlarged head for closing against the seat, a skirt on the enlarged head projecting into said auxiliary chamber adjacent one of said openings, means including a cam for moving the stem axially to open and close the valve head with respect to the stationary seat, and means for turning the stem to cause said skirt to vary the effective size of the latter said opening.

5. The combination set forth in claim 4 wherein the skirt is shaped so that axial movement thereof does not vary the effective size of the latter said opening.

6. The combination set forth in claim 4 wherein the skirt is shaped so that axial movement thereof changes the effective size of the latter said opening.

7. In an internal combustion piston engine having a main combustion chamber and an auxiliary combustion chamber connected by a torch nozzle, and having means including a first intake passage for delivering a lean mixture to the main chamber and means including a second intake passage for delivering a rich mixture to the auxiliary chamber, the improvement comprising, in combination: a spark plug having electrodes positioned in a plug chamber adjacent the auxiliary combustion chamber, means forming a restricted opening connecting the plug chamber to the auxiliary chamber, an auxiliary intake valve assembly positioned to control flow through the second intake passage into the auxiliary chamber, said intake valve assembly having a stationary seat and having a stem provided with an enlarged head for closing against the seat, two skirts on the enlarged head each projecting away from said stem and into said auxiliary chamber, one of the skirts extending near the torch nozzle and the other skirt extending near said restricted opening, means including a cam for moving the stem axially to open and close the valve head with respect to the stationary seat, and means for turning the stem to cause said skirts to vary the effective sized of the torch nozzle and said restricted opening.

8. The method of operating an internal combustion piston engine having a main combustion chamber and an auxiliary combustion chamber connected by a torch nozzle, comprising the steps of: delivering a lean mixture to the main chamber, delivering a rich mixture to the auxiliary chamber, sparkigniting the mixture in the auxiliary chamber through a restricted opening to project a flame through the torch nozzle into the main chamber, controlling flow of rich mixture into the auxiliary chamber, and varying the effective size of the restricted opening throughout a predetermined range only under varying opeerating conditions of the engine.

9. The method of operating an internal combustion piston engine having a main combustion chamber and an auxiliary combustion chamber connected by a torch nozzle, comprising the steps of: delivering a lean mixture to the main chamber, delivering a rich mixture to the auxiliary chamber, sparkigniting the mixture in the auxiliary chamber through a restricted opening to project a flame through the torch nozzle into the main chamber, controlling flow of rich mixture into the auxiliary chamber, and varying the effective sizes of the torch nozzle and the restricted opening throughout a predetermined range only under varying operating conditions of the engine.

* * * * *